(12) United States Patent
Jung et al.

(10) Patent No.: US 9,165,602 B2
(45) Date of Patent: Oct. 20, 2015

(54) INFORMATION STORAGE MEDIUM STORING MULTI-ANGLE DATA AND METHOD AND APPARATUS FOR REPRODUCING THE MULTI-ANGLE DATA

(71) Applicant: SAMSUNG ELECTRONICS CO., LTD., Suwon-si (KR)

(72) Inventors: Kil-soo Jung, Osan-si (KR); Seong-jin Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/036,117

(22) Filed: Sep. 25, 2013

(65) Prior Publication Data

US 2014/0023344 A1    Jan. 23, 2014
US 2015/0262614 A9    Sep. 17, 2015

Related U.S. Application Data

(63) Continuation of application No. 12/899,765, filed on Oct. 7, 2010, now Pat. No. 8,571,391, which is a continuation of application No. 10/919,349, filed on Aug. 17, 2004, now Pat. No. 7,835,619, which is a
(Continued)

(30) Foreign Application Priority Data

Sep. 23, 2003    (KR) .................. 10-2003-0066022

(51) Int. Cl.
*H04N 9/80*     (2006.01)
*G11B 27/031*   (2006.01)
(Continued)

(52) U.S. Cl.
CPC ............ *G11B 27/031* (2013.01); *G11B 27/105* (2013.01); *G11B 27/3027* (2013.01);
(Continued)

(58) Field of Classification Search
CPC ................................ G11B 27/105; G11B 7/00
USPC .................................................. 386/241, 248
See application file for complete search history.

(56) References Cited

U.S. PATENT DOCUMENTS 5,825,727 A    10/1998    Han
5,870,523 A    2/1999    Kikuchi et al.
(Continued)

FOREIGN PATENT DOCUMENTS

CN    1197571 A    10/1998
EP    0 847 200 A1    6/1998
(Continued)

OTHER PUBLICATIONS

Search Report issued in Singapore Patent Application No. 200405952-3 on Nov. 19, 2005.
(Continued)

*Primary Examiner* — Hung Dang
*Assistant Examiner* — Girumsew Wendmagegn
(74) *Attorney, Agent, or Firm* — NSIP Law

(57) ABSTRACT

An apparatus and method for reproducing multi-angle data in a seamless manner, even during a change of angle, and an information storage medium on which the multi-angle data is recorded. AV data divided into clips, which are recording units, is recorded on the information storage medium. Additional information regarding jump points is recorded on a space of the information storage medium other than where the clips are recorded. The apparatus for reproducing the multi-angle data includes a reading unit which reads data from the information storage medium, and a reproducing unit which reproduces the data read by the reading unit by searching for and reproducing clips corresponding to the read data when the read data is multi-angle data, and, if there is an angle change command, reproducing clips for a new angle from a jump point of the clip for the new angle.

1 Claim, 5 Drawing Sheets

Related U.S. Application Data continuation of application No. 10/889,113, filed on Jul. 13, 2004, now Pat. No. 7,653,287.

(60) Provisional application No. 60/511,125, filed on Oct. 15, 2003.

(51) Int. Cl.

| | | |
|---|---|---|
| *G11B 27/10* | (2006.01) | |
| *G11B 27/30* | (2006.01) | |
| *G11B 27/32* | (2006.01) | |
| *H04N 21/845* | (2011.01) | |
| *G11B 20/10* | (2006.01) | |
| *H04N 5/765* | (2006.01) | |
| *H04N 5/781* | (2006.01) | |
| *H04N 5/85* | (2006.01) | |
| *H04N 5/907* | (2006.01) | |
| *H04N 9/804* | (2006.01) | |
| *H04N 9/82* | (2006.01) | |

(52) U.S. Cl.
CPC ............ *G11B27/329* (2013.01); *H04N 9/8227* (2013.01); *H04N 21/8455* (2013.01); *G11B 20/10527* (2013.01); *G11B 2020/10537* (2013.01); *G11B 2020/10759* (2013.01); *G11B 2020/10944* (2013.01); *G11B 2220/216* (2013.01); *G11B 2220/2562* (2013.01); *G11B 2220/2575* (2013.01); *H04N 5/765* (2013.01); *H04N 5/781* (2013.01); *H04N 5/85* (2013.01); *H04N 5/907* (2013.01); *H04N 9/8042* (2013.01); *H04N 9/8205* (2013.01)

(56) References Cited

U.S. PATENT DOCUMENTS

| | | | |
|---|---|---|---|
| 5,884,004 A | 3/1999 | Sato et al. | |
| 5,894,320 A | 4/1999 | Vancelette | |
| 6,041,056 A | 3/2000 | Bigham et al. | |
| 6,181,872 B1 | 1/2001 | Yamane et al. | |
| 6,341,330 B1 | 1/2002 | deCarmo | |
| 6,393,574 B1 | 5/2002 | Kashiwagi et al. | |
| 6,415,101 B1 | 7/2002 | deCarmo et al. | |
| 7,006,756 B1 | 2/2006 | Keesen et al. | |
| 7,653,287 B2 | 1/2010 | Jung et al. | |
| 7,835,619 B2 | 11/2010 | Jung et al. | |
| 8,571,391 B2 * | 10/2013 | Jung et al. | 386/341 |
| 2002/0145702 A1 | 10/2002 | Kato et al. | |
| 2004/0247290 A1 | 12/2004 | Seo et al. | |
| 2010/0054711 A1 | 3/2010 | Kato | |

FOREIGN PATENT DOCUMENTS

| | | |
|---|---|---|
| EP | 0 986 248 A1 | 3/2000 |
| EP | 1 187 134 A1 | 3/2002 |
| EP | 1 292 124 A1 | 3/2003 |
| EP | 1 519 385 A1 | 3/2005 |
| JP | 11-027630 A | 1/1999 |
| JP | 11-110950 A | 4/1999 |
| JP | 2002-524981 A | 8/2002 |
| JP | 2003-069954 A | 3/2003 |
| JP | 2003-087742 A | 3/2003 |
| JP | 2006-506771 A | 2/2006 |
| KR | 1999-63895 A | 7/1999 |
| WO | WO 2004/045206 | 5/2004 |

OTHER PUBLICATIONS

Office Action issued in Canadian Patent Application No. 2,482,239 on Jan. 24, 2006.
Office Action issued in Korean Patent Application No. 2003-66022 on Jan. 27, 2006.
Office Action issued in Chinese Patent Application No. 200410080002.2 on Feb. 9, 2007.
Search Report issued in corresponding Malaysian Patent Application No. PI20043753 dated Jan. 29, 2008.
Japanese Office Action issued on Jun. 22, 2010, in corresponding Japanese Patent Application No. 2004-275989 (4 pages).
Japanese Office Action mailed Sep. 4, 2012, issued in counterpart Japanese Patent Application No. 2010-211756; 2 pages in Japanese language.

* cited by examiner

INFORMATION STORAGE MEDIUM STORING MULTI-ANGLE DATA AND METHOD AND APPARATUS FOR REPRODUCING THE MULTI-ANGLE DATA

CROSS REFERENCE TO RELATED APPLICATIONS

This application is a continuation of U.S. patent application Ser. No. 12/899,765, filed on Oct. 7, 2010; which is a continuation of U.S. patent application Ser. No. 10/919,349, filed on Aug. 17, 2004; which is a continuation of U.S. patent application Ser. No. 10/889,113, filed on Jul. 13, 2004; which claims the priority of Korean Patent Application No. 10-2003-0066022, filed on Sep. 23, 2003, in the Korean Intellectual Property Office; and U.S. Provisional Application No. 60/511,125, filed on Oct. 15, 2003, in the U.S. Patent & Trademark Office; the entire disclosure of each of which is incorporated herein by reference for all purposes.

BACKGROUND

1. Field

The following description relates to seamless reproduction of multi-angle data, and more particularly, to an apparatus and method for guaranteeing seamless reproduction of multi-angle data, even during a change of angle, and an information storage medium on which the multi-angle data is recorded.

2. Description of the Related Art

Data obtained by photographing a scene at various angles and encoding the result is called multi-angle data. While a viewer watches a scene by reproducing contents containing the multi-angle data, if the viewer wants to see the scene photographed at a different angle, the viewer inputs an angle change command to a reproducing apparatus. After receiving the command, the reproducing apparatus reproduces data for a new angle. To guarantee seamless reproduction during angle change, the multi-angle data is stored using an interleaving method in which the multi-angle data is divided into units having a specified size and the units are recorded in an alternating fashion. To search for and reproduce data blocks for one angle in the interleaved multi-angle data, additional information for tracing data blocks by angles is recorded within a video bit stream.

Arrival time information, such as an arrival time stamp (ATS), is added to each angle data of the multi-angle data. When an angle data is reproduced, it is output and reproduced according to the ATS. In general, since an independent ATS is added to the angle data, seamless reproduction (i.e., without pause), cannot be ensured during change of angle.

SUMMARY

Provided is an apparatus and method for continuously reproducing multi-angle data, even during a change of angle, and an information storage medium on which the multi-angle data is recorded.

According to an aspect, there is provided an information storage medium on which AV data for a plurality of angles is recorded, including at least one clip, which is a recording unit of the AV data for an angle. The AV data have a plurality of jump points which are access points which enable jumping from the angle to a different angle, and AV data having the same jump points have the same presentation time information.

According to another aspect, there is provided an information storage medium on which AV data for a plurality of angles is recorded, including at least one clip, which is a recording unit of the AV data for an angle. The AV data has a plurality of jump points which are access points which enable jumping from the angle to a different angle, the AV data have data which provides a reference time, and AV data having the same jump points have the same arrival time information as AV data that provides a reference time.

According to another aspect, there is provided an information storage medium on which AV data for a plurality of angles is recorded, including at least one clip which is a recording unit of the AV data for an angle The AV data has a plurality of jump points which are access points which enable jumping from the angle to a different angle, the AV data have data which provides a reference time and arrival time information of subsequent AV data, and AV data having the same jump points have arrival time information that is between arrival time information of AV data that provides a reference time and arrival time information of subsequent AV data.

According to still another aspect, there is provided an apparatus for reproducing data from an information storage medium on which AV data divided into clips is recorded, and additional information regarding jump points is recorded separately from the clips. The apparatus includes: a reading unit which reads the AV data from the information storage medium; and a reproducing unit which reproduces the data read by the reading unit by searching for and reproducing a clip corresponding to the read data and, when a command to change to a new angle is received, reproducing a clip for the new angle from a jump point of the clip for the new angle. Each clip has a plurality of jump points which are access points which enable jumping from the angle to a different angle, and the AV data having the same jump points have the same presentation time information.

According to yet another aspect, there is provided a method of reproducing data from a storage medium on which AV data divided into clips is recorded, and additional information regarding jump points is recorded separately from the clips. The method includes: reading the AV data from the storage medium; reproducing the read data; and receiving a command to change from an angle to a new angle. The reproducing reproduces a clip corresponding to the read data and, when a command to change to a new angle is received, the reproducing reproduces a clip for the new angle from a jump point of the clip for the new angle. Each clip has a plurality of jump points which are access points which enable jumping from the angle to the new angle, and AV data having the same jump points have the same presentation time information.

According to another aspect, there is provided a computer-readable recording medium on which a program code for causing a computer to perform a method of reproducing data from a storage medium on which AV data divided into clips is recorded, and additional information regarding jump points is recorded separately from the clips. The method includes: reading the AV data from the storage medium; reproducing the read data; and receiving a command to change from an angle to a new angle. The reproducing reproduces a clip corresponding to the read data and, when a command to change to a new angle is received, the reproducing reproduces a clip for the new angle from a jump point of the clip for the new angle. Each clip has a plurality of jump points which are access points which enable jumping from the angle to the new angle, and AV data having the same jump points have the same presentation time information.

According to still another aspect, there is provided a method of seamlessly reproducing multi-angle data including: completing reproduction of angle data for a first angle; changing the angle to be reproduced; and reproducing angle data for a second angle. The angle data have a plurality of jump points which are access points which enable jumping from the first angle to the second angle, and angle data having the same jump points have the same presentation time information.

Other features and aspects may be apparent from the following detailed description, the drawings, and the claims.

Figure 1:
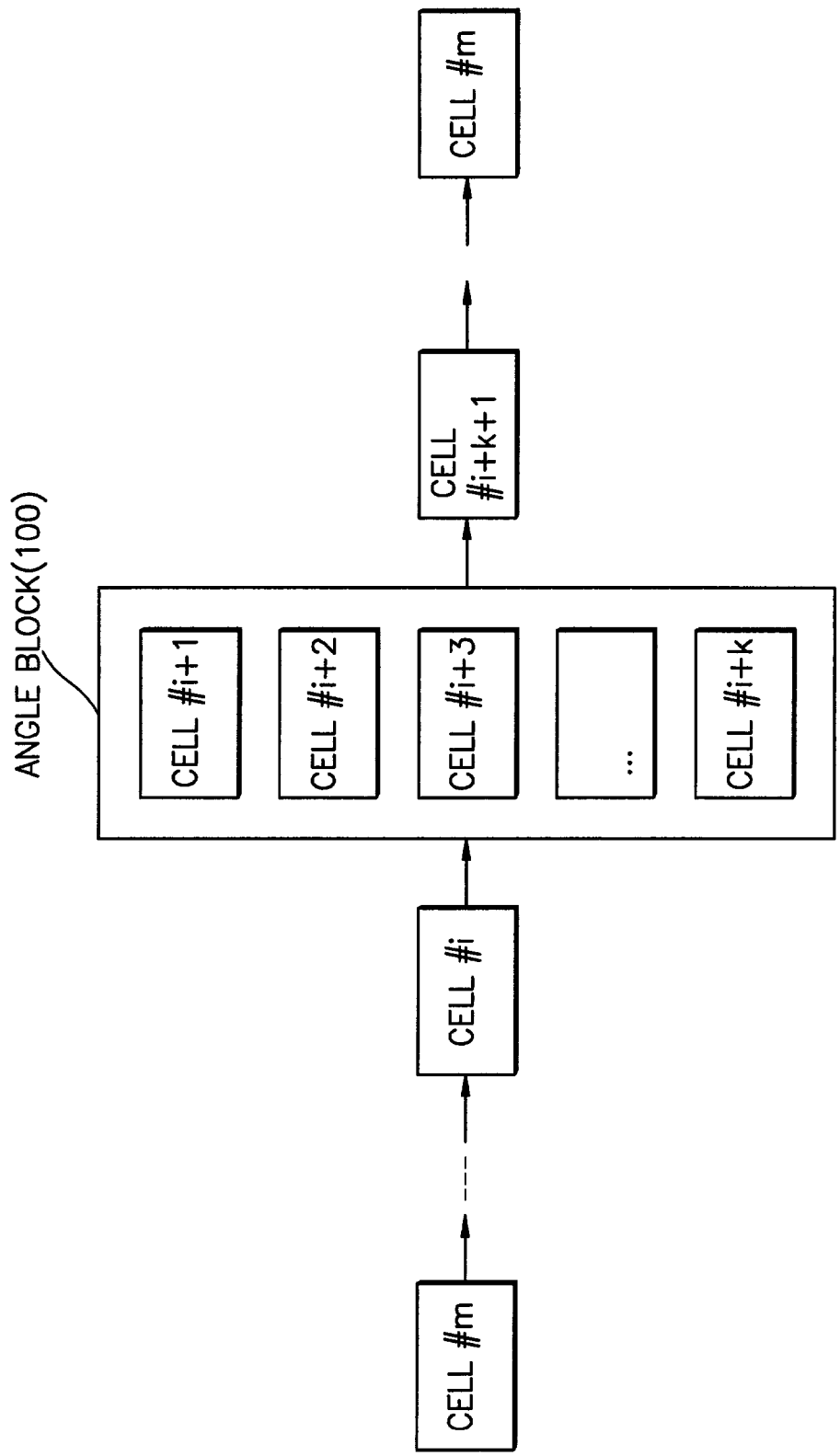
FIG. 1 is a diagram of an angle block on which multi-angle data is recorded.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 is a diagram of an angle block in which multi-angle data is stored.

Referring to FIG. 1, an angle block 100 is constructed such that a plurality of cells are arranged in parallel. These cells can be reproduced only one at a time by a user's selection. The cells that form the angle block have the same reproduction time and correspond to a specific angle. If the cells, which are units of reproduction, form an angle block, data for a specific angle is divided into interleaved units (ILVUs) and recorded on video objects (VOBs), which are recording units, and cells, which are recording units, using the interleaving method.

Figure 2:
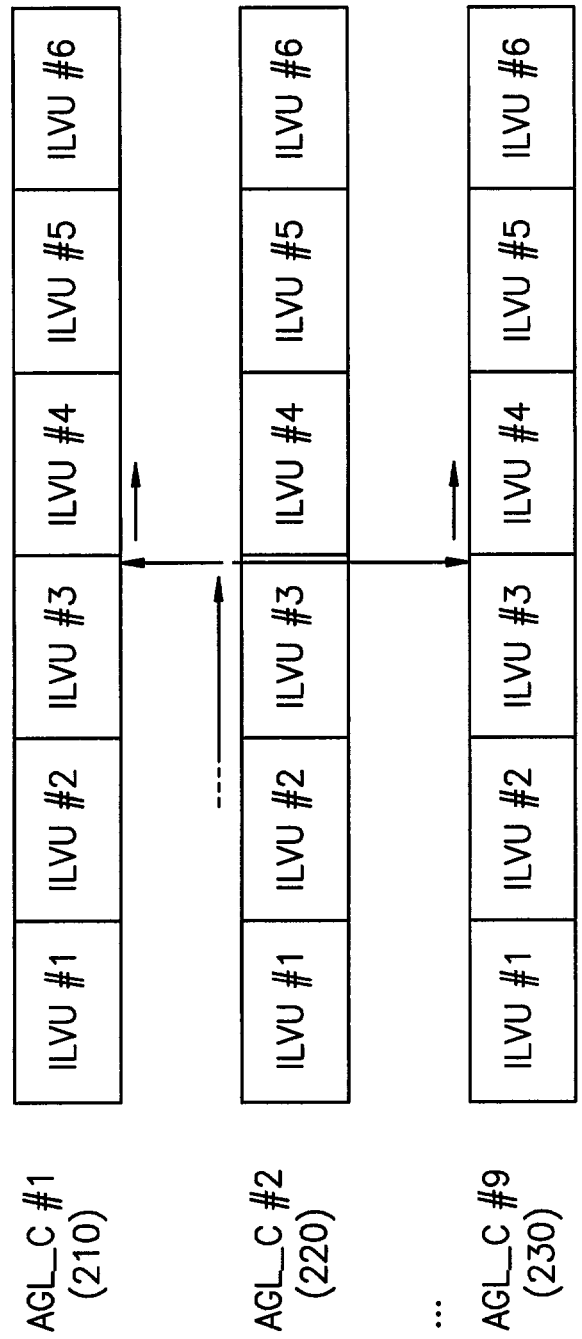
FIG. 2 is a diagram of angle data and used for explaining a process of receiving an angle change command, and jumping to another angle data.

FIG. 2 is a diagram of angle data and used for explaining a process of receiving an angle change command, and jumping to another angle data.

Each angle data comprises ILVUs. The maximum number of angles supported by a Digital Video Disc (DVD) is nine. Referring to FIG. 2, first angle data is AGL_C #1 210, second angle data is AGL_C #2 220, . . . ninth angle data is AGL_C #9 230. To reproduce the first or ninth angle data while the second angle data AGL_C #2 220 is being reproduced, a jump is made to a pertinent ILVU of the first or ninth angle data. To seamlessly reproduce video data even if a user issues a command to change angles at a certain time during reproduction of an ILVU of the second angle data, it is necessary to complete reproduction of the currently reproduced ILVU of the second angle data and then jump to the desired ILVU of the first or ninth angle data.

Figure 3:
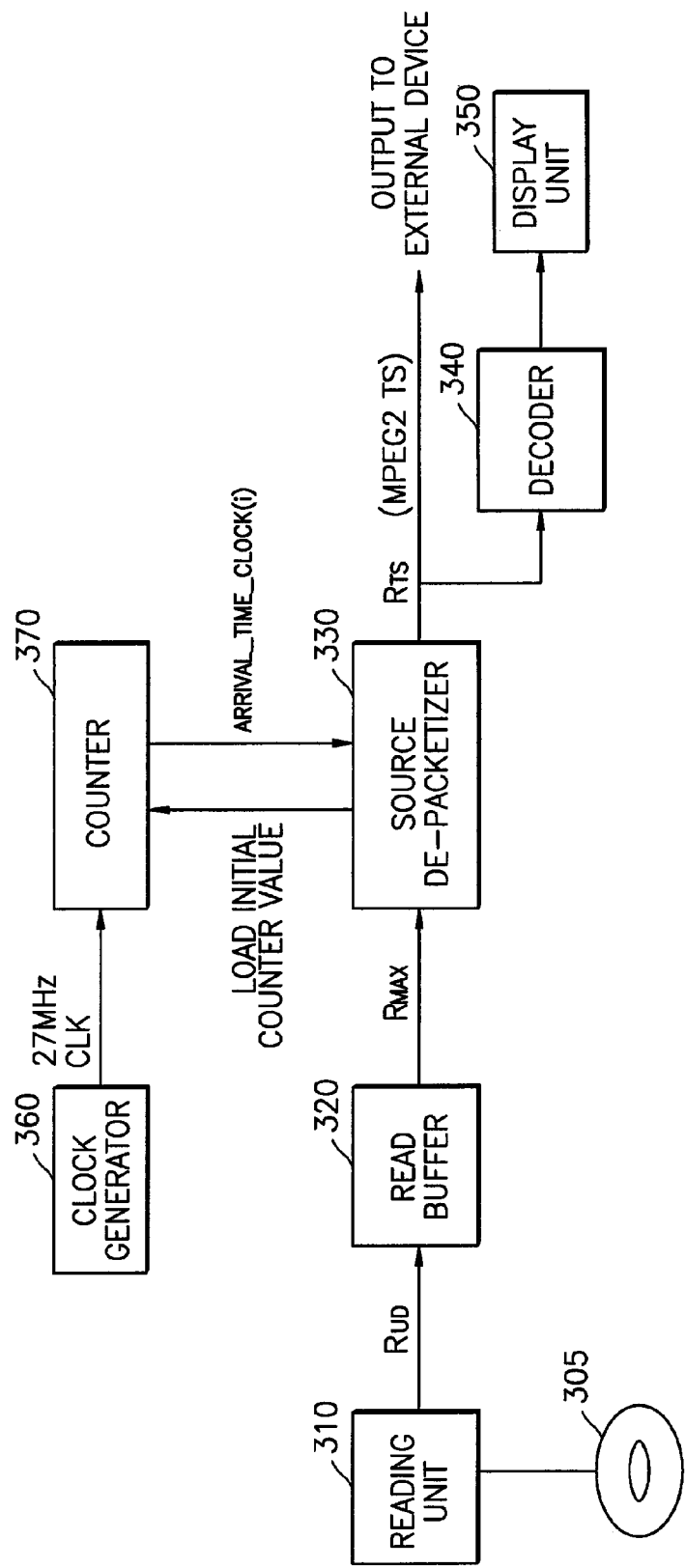
FIG. 3 is a block diagram of an apparatus for reproducing a motion picture experts group (MPEG)-2 transport stream (TS) from a storage medium according to an embodiment.

FIG. 3 is a block diagram of an apparatus for reproducing a motion picture experts group (MPEG)-2 transport stream (TS) from a storage medium.

A reading unit 310 reads AV data from a storage medium 305 on which the AV data is stored in the form of an MPEG-2 TS. A read buffer 320 temporarily stores the data at a read data rate $R_{ud}$. A source de-packetizer 330 reads the data stored in the read buffer 320 at a read data rate $R_{max}$ of the read buffer 320, removes an arrival time stamp (ATS) from the data, and outputs the data in the form of MPEG-2 TS packets. A decoder 340 decodes an MPEG-2 TS according to a presentation time stamp (PTS) contained in the MPEG-2 TS packets, and displays the result on a display unit 350.

The AV data recorded on the storage medium 305 is packet data formed by coding audio or video data and breaking it up into packets having a specified size according to a specified transmission method. For example, if the data is transmitted in the form of the MPEG-2 TS according to ISO/IEC 13818-1 standards, the specified size of the packets is 188 bytes. As a further example, if the data is transmitted using an asynchronous transfer mode (ATM) method, the specified size of packets is 53 bytes. The packet data may be transmitted over, for example, a cable or a local area network (LAN).

When the packet data is transmitted in digital broadcasting, transmission time intervals between the packet data are not constant. That is, a transmitter transmits the packet data at appropriate time intervals considering a buffering state of a receiver, and the receiver decodes and displays the packet data immediately after receiving the packet data.

However, when the packet data is recorded on a storage medium, it is inefficient to store it at the transmission time intervals. Accordingly, transmission time information is added to the packet data. The inconstant time intervals at which the packet data is transmitted are important when the stored packet data is output to the decoder. This is because a buffer of the receiver overflows or underflows if the packet data is transmitted to the decoder regardless of the transmission time information. Accordingly, a transmission system is constructed such that the transmitter adjusts the time intervals between the packet data considering the state of the buffer in the receiver and transmits the packet data at the adjusted time intervals.

If the packet data is stored on the storage medium, not in the transmission system, it is necessary to add arrival time information to all the packets and output the packets to the reproducing apparatus according to the information. To this end, the reproducing apparatus includes a clock generator 360 which generates a clock of a specified frequency. The clock generator 360 generates clock signals at, by way of non-limiting example, 27 MHz. The reproducing apparatus also includes a counter 370 which counts the clock signals, e.g., 27 MHz clock signals, generated by the clock generator 360. The counter 370 receives an initial counter value from the source de-packetizer 330 to set an initial value, and then, counts the 27 MHz clock signals and transmits arrival time information to the source de-packetizer 330.

Figure 4:
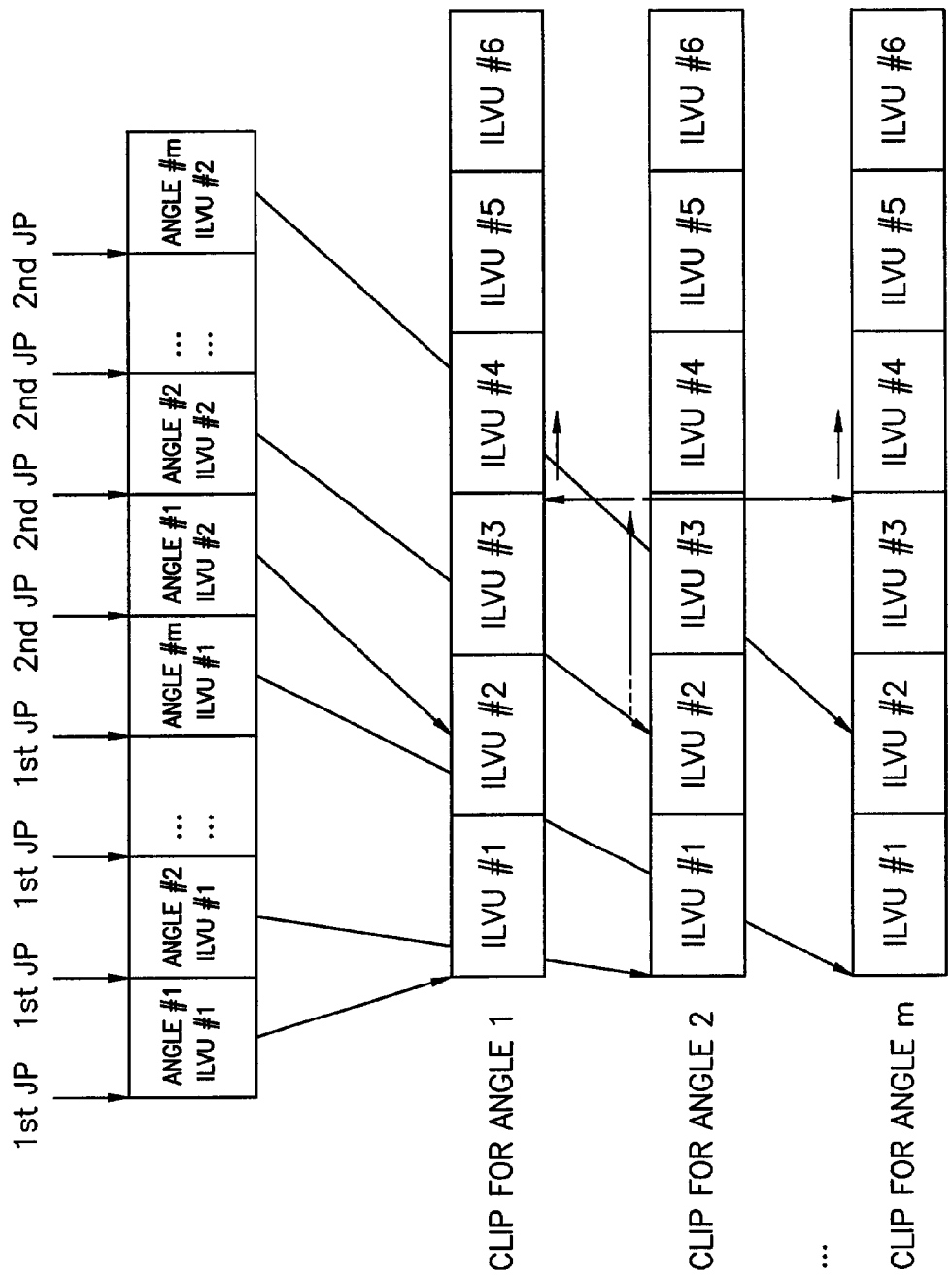
FIG. 4 is a diagram of clips for angles.

FIG. 4 is a diagram of clips for angles.

Referring to FIG. 4, information about jump points is contained in clip information. Jump points located at the same positions have the same PTS value. To continuously (i.e., seamlessly) reproduce video data, even during a change of angle, the decoder 330 reads and decodes data for a desired angle having the same time as data for a current angle, with reference to the PTS value contained in the MPEG-2 TS, and displays the decoded data through the display unit 350.

The jump points have position information about data for a first angle for a second angle. Additional information regarding intervals and positions of the jump points is recorded in a separate space of the storage medium and is used for searching for a new position of data to be reproduced by performing a seamless reproduction process during a change of angle. Clips desired to be reproduced at the same time may have the same PTS value. Thus, arrival time information of packets input from the source de-packetizer to the decoder allows seamless reproduction of video data during a change of angle.

That is, to continuously reproduce AV data, even during a change of angle, ATC values as well as STC values are consistently maintained. When a user changes angles and a new clip is input from the read buffer to the source de-packetizer, the reproducing apparatus does not reset a counter for an arrival time clock with reference to a first ATS value of the newly read clip. If the counter is reset with reference to the first ATS value of the new clip, a discontinuity occurs in the ATC and the MPEG-2 TS data input to a buffer in the decoder underflows or overflows, and seamless reproduction is not assured.

Accordingly, the packet data for angles in the packet data structure for seamless reproduction have appropriate ATS values, and even if the packet data is changed, the reproducing apparatus does not reset the counter and continuously operates according to a preset ATC.

A clip of data for one angle comprises several small ILVUs. In the case where there are clips for many angles of one scene, the clips are recorded in an interleaved manner. In this case, an ILVU is a unit of jumping, and a starting point of each ILVU is called a jump point. To reproduce a clip for one angle, a jump is made to an ILVU of the angle. The jump point is used to search for a subsequent ILVU after completion of reproduction of the current ILVU. The jump point is also used during a change of angle.

The jump point information about clips which are reproduced at the same time has the same PTS value and the same ATS value to prevent discontinuity. It is also possible that the jump point information has a value between the same ATS value and an ATS value of a subsequent jump point to achieve seamless reproduction.

Figure 5:
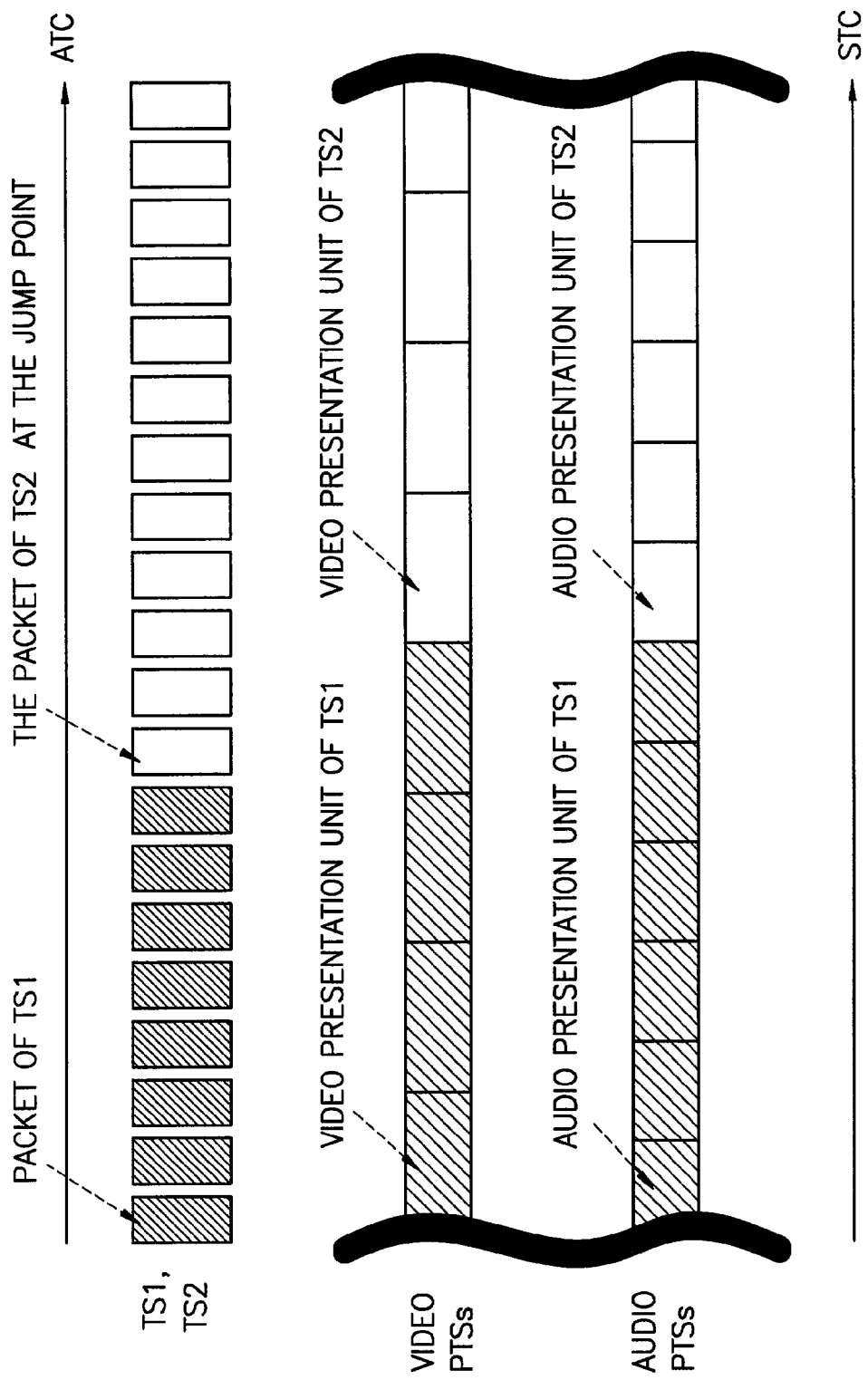
FIG. 5 is a diagram illustrating a decoding process according to an arrival time clock (ATC) and a system time clock (STC) during seamless change of angle according to an embodiment.

FIG. 5 is a diagram illustrating a decoding process according to an ATC and an STC during a seamless change of angle.

Referring to FIG. 5, even though the angle is changed during AV data reproduction, a continuous decoding process is performed without causing discontinuity in the ATC and STC. That is, even when a new clip is input in the reproducing apparatus of FIG. 3, the counter is not reset with reference to ATS and STC values of the new clip. In order for the reproducing apparatus to continuously reproduce the video, the same jump points must have the same PTS values. To this end, an ATS value of a packet to which a jump needs to be made may be equal to an ATS value of a first TS packet, or a value between the ATS value of the first packet and the ATS value of the next jump point.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As described above, the apparatus and method according to embodiments may seamlessly reproduce multi-angle data by first completing the reproduction of angle data photographed at one angle, changing the angle, and reproducing angle data photographed at the new angle.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for reproducing data from a storage medium on which AV data divided into clips is recorded, and additional information regarding jump points is recorded separately from the clips, the method comprising:

reading the AV data from the storage medium;

removing an arrival time stamp (ATS) from the read AV data by using a source de-packetizer and outputting the AV data from which the ATS is removed;

initializing a counter based on information received from the source de-packetizer, the counter providing arrival time information for the source de-packetizer;

reproducing the AV data from which the ATS is removed by the source de-packetizer; and in response to a command to change from an angle to a new angle, reproducing a clip for the new angle from a jump point of the clip for the new angle, each clip comprising a plurality of jump points which are access points which enable jumping from the angle to the new angle, AV data with the same jump points comprising the same presentation time information, wherein each of the clips corresponding to each of the plurality of angles, comprises a plurality of interleaved units, a plurality of interleaved units of a defined clip are interleaved with a plurality of interleaved units of remaining clips, and jump through jumping points occurs not only for angle change but also for normal playback.

* * * * *